(12) United States Patent
Bagabas et al.

(10) Patent No.: US 8,362,094 B1
(45) Date of Patent: Jan. 29, 2013

(54) ZINC-OXIDE NANOPARTICLES AND THEIR USE FOR PHOTO CATALYTIC DEGRADATION OF CYANIDE

(75) Inventors: Abdulaziz A Bagabas, Riyadh (SA); Reda M. Mohamed, Cairo (EG); Mohamed F. A. Aboud, Cairo (EG); Mohamed Mokhtar M. Mostafa, Cairo (EG); Ahmad S. Alshammari, Riyadh (SA); Zeid A. Al-Othman, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 13/562,021

(22) Filed: Jul. 30, 2012

Related U.S. Application Data (62) Division of application No. 13/342,104, filed on Jan. 1, 2012, now Pat. No. 8,252,256.

(51) Int. Cl.
*C01G 9/00* (2006.01)

(52) U.S. Cl. .................................... 516/88; 210/748.14

(58) Field of Classification Search .................. 423/101, 423/102, 622; 516/88; 210/748, 748.14
See application file for complete search history.

(56) References Cited

U.S. PATENT DOCUMENTS 8,252,256 B2 * 8/2012 Bagabas et al. ............... 423/101

* cited by examiner

*Primary Examiner* — Steven Bos
(74) *Attorney, Agent, or Firm* — Geeta Kadambi; Riddhi IP LLC (57) ABSTRACT

A simple, room-temperature method of producing zinc oxide nanoparticles was established by reacting zinc nitrate hexahydrate and cyclohexylamine (CHA) in either aqueous or ethanolic medium. Particles of polyhedra morphology were obtained for zinc oxide, prepared in EtOH ($ZnO_E$) and zinc oxide prepared in water ($ZnO_W$). The results indicate that there are significant morphological differences between $ZnO_E$ and $ZnO_W$. $ZnO_E$ showed a regular polyhedral shape, while spherical and chunky particles were observed for $ZnO_W$. The morphology was crucial in enhancing the cyanide ion photocatalytic degradation efficiency of $ZnO_E$ by a factor of 1.5 in comparison to the efficiency of $ZnO_W$ at equivalent loading of 0.0166 ZnO nanoparticles wt %.

5 Claims, 12 Drawing Sheets

ZINC-OXIDE NANOPARTICLES AND THEIR USE FOR PHOTO CATALYTIC DEGRADATION OF CYANIDE

CROSS REFERENCE TO RELATED APPLICATION

This application is a divisional application and claims priority to U.S. patent application Ser. No. 13/342,104 filed on Jan. 1, 2012. Pending application is hereby incorporated by reference in their entireties for all their teachings.

FIELD OF TECHNOLOGY

This disclosure generally relates to synthesize zinc oxide nanoparticles in either water or ethanol (EtOH) at room temperature (RT); and using the said nanoparticles for photo-catalytically degrading cyanide present in soil or water as toxic contaminant.

BACKGROUND

Cyanide is used or produced in several industries such as gas production, metal plating, pharmaceuticals, and mining [Botz et al. 2004, Young C. A. 2001]. This extensive use of cyanide has resulted in the generation of billions of cyanide waste gallons, which has increased the cyanide spill risk to the environment at several locations such as those at Baia Mare (Romania), Kumtor (Kyrgyzstan), Omai (Guyana), and Summitville (Colo.) [Deschenes et al. 2004, Chew et al. 1999]. Thus, cyanide must be treated before discharging.

Various treatment procedures such as adsorption, complexation, and oxidation are known for treating cyanides [Botz et al. 2004, Young C. A. 2001, Young et al 2001, Otto et al. 1980, Gurol et al. 1985]. The procedures other than oxidation give highly concentrated products in which toxic cyanides still exist. The most common method for treating cyanide is alkaline chlorination. However, improper chlorination of cyanide leads to evolution of toxic cyanogen chloride (NCCl). Chlorination also gives high total dissolved solids (TDS) in the treated water. However, ferrate $[FeO_4]^{2-}$, as a green chemical oxidant, can address some of the concerns of chlorination in the treatment of cyanides [Chang et al. 1997, O'Brien et al. 1998].

There is a need to remove the cyanide, as pollutant, so that existing limited water resources may be purified and recycled. There is also a serious need to clean up the soil from cyanide. There is a need for establishing an inexpensive and efficient method for removing cyanide.

SUMMARY

The invention discloses a novel method for synthesizing ZnO nanoparticles photo-catalyst and the effect of synthesizing medium on their physico-chemical properties. The instant disclosure also discloses a process of using the ZnO nanoparticles to remove cyanide from water and soil by photo-catalysis method.

In one embodiment, method of synthesizing ZnO nanoparticles at RT from zinc nitrate hexahydrate and cyclohexylamine (CHA) in aqueous solution is described.

In one embodiment, the morphology of zinc oxide nanoparticles prepared in water ($ZnO_W$) is determined by the physiochemical properties of the synthesis medium. In another embodiment, $ZnO_W$ IS used in different weight ratios to perform the photo-catalytic degradation of cyanide present in aqueous solution.

In another embodiment, characterizations of several properties of the novel $ZnO_W$ nanoparticles were performed. These characterizations were performed to prove the purity and efficacy of the prepared ZnO materials as well as to demonstrate the current methods efficiency and effectiveness.

In one embodiment, kinetics for cyanide photo-catalytic degradation was investigated with respect to $ZnO_W$ weight loading percentage.

In one embodiment, a well-controlled synthesis process at RT for economical use of ZnO in catalytic applications such as water treatment and other environmental applications are disclosed. In another embodiment, a direct, simple, room-temperature synthesis method for ZnO nanoparticles using CHA, as a precipitating agent, and zinc nitrate hexahydrate, as a source of zinc, in either aqueous or EtOHic media are disclosed.

The novel method of synthesizing $ZnO_W$ nanoparticles and method of using them in the photo-catalytic degradation of cyanide in aqueous solutions, disclosed herein, may be implemented in any means for achieving various aspects. Other features will be apparent from the accompanying figures and from the detailed description that follows.

BRIEF DESCRIPTION OF THE DRAWINGS

Example embodiments are illustrated by way of example and no limitation in the tables and in the accompanying figures, like references indicate similar elements and in which.

Other features of the present embodiments will be apparent from the accompanying figures, tables and from the detailed description that follows.

DETAILED DESCRIPTION

Several embodiments for novel synthesizing method for $ZnO_W$ nano particles and their application in the photo-catalytic degradation of cyanide in water and soil are disclosed. Although the present embodiments have been described with reference to specific example embodiments, it will be evident that various modifications and changes may be made to these embodiments without departing from the broader spirit and scope of the various embodiments.

Synthesis of $ZnO_W$ Nanoparticles:

Materials-Zinc nitrate hexahydrate (pure, POCH), cyclohexylamine (GC>99%, Merck), absolute EtOH (99.9%, Scharlau), potassium cyanide ($\geq$97%, Sigma-Aldrich), potassium iodide ($\geq$99.5%, Sigma-Aldrich), and ammonia solution (28-30% $NH_3$ basis, Sigma-Aldrich) were commercially available and were used as received. Deionized water (18.2 M$\Omega\cdot$cm) was obtained from a Milli-Q water purification system (Millipore).

Method of Synthesizing and Characterization of the $ZnO_W$ Nanoparticles:

Preparation of ZnO Nanoparticles in Water ($ZnO_W$)

A 30 mmol of zinc nitrate hexahydrate was dissolved in 60 ml of water at RT under stirring. In a separate beaker, 60 mmol of CHA was dissolved in 20 ml water at RT. The CHA solution was poured into the zinc solution, resulting in a white precipitate, upon stifling. An extra amount of 80 ml water was added to the reaction mixture, which left stifling for four days. The precipitate was filtered through F-size fritted filter, and then was washed with 100 ml water. The precipitate was dried under vacuum for one day. After drying, the precipitate was mixed with 300 ml water and was magnetically stirred for one day for removing impurity. The precipitate was filtered and was dried to give 2.432 g (yield %=89.68) of $ZnO\cdot\frac{1}{2}H_2O$, as proven by ICP elemental analysis [Zn (cal. 72.34%, exp. 72.88%].

Characterization of Materials and Nanoparticles:

ICP was used to determine the content of zinc component in the unclacined ZnO, obtained at RT.

XRD patterns were recorded for phase analysis and crystallite size measurement on a Philips X pert pro diffractometer, operated at 40 mA and 40 kV by using $CuK_\alpha$ radiation and a nickel filter, in the 2 theta range from 2 to 80° in steps of 0.02°, with a sampling time of one second per step. The crystallite size was estimated using Scherer's equation. XRD patterns were recorded for ZnO materials before calcination and after calcination at 500° C. XPS spectra for uncalcined ZnO powder samples were recorded on Jeol JPS 9010MC spectrometer by using $MgK_\alpha$ X-ray radiation (hv=1253.6 eV), operated at 20 mA and 10 kV. The base pressure in the analysis chamber was kept around $2.6\times10^{-7}$ Pa. Energy scales were referred to the line of Al 2p at 73.9 eV.

DRIFT spectra of ground, uncalcined ZnO powder samples, diluted with IR-grade potassium bromide (KBr), were recorded on a Perkin Elmer FTIR system spectrum GX in the range of 400-4000 $cm^{-1}$ at room temperature.

Solid-state ultraviolet-visible (UV-Vis) absorption spectra for calcined ZnO powder samples were recorded on a Perkin Elmer Lambda 950 UV/Vis/NIR spectrophotometer, equipped with 150 mm snap-in integrating sphere for capturing diffuse and specular reflectance.

The morphology was investigated using a field-emission scanning electron microscope (FE-SEM model: FEI-200NNL), equipped with energy dispersive X-ray (EDX) spectrometer for elemental analysis, and a high-resolution transmission electron microscope (HRTEM model: JEM-2100F JEOL). EDX spectrometry was used to analyze the surface chemical composition of the ZnO samples. Carbon-coated copper grids were used for mounting the samples for HRTEM analysis.

The photocatalytic evaluation was carried out using a horizontal cylinder annular batch reactor. A black light-blue florescent bulb (F18W-BLB) was positioned at the axis of the reactor to supply UV illumination. The reaction suspension was irradiated by UV light of 365 nm at power of 18 W. The experiments were performed by suspending 0.0083, 0.0166, 0.0333, 0.0500, or 0.0666 wt. % of calcined ZnO into a 300-ml, 100 ppm potassium cyanide (KCN) solution, with its pH adjusted to 8.5 by ammonia solution. The reaction was carried out isothermally at 25° C. and samples of the reaction mixture were taken at different intervals over a total reaction time of six hours. The $CN^-_{(aq)}$ concentration in the samples was estimated by volumetric titration with $AgNO_3$, using potassium iodide to determine the titration end-point. The removal efficiency of $CN^-_{(aq)}$ has been measured by applying the following equation; % Removal efficiency=$(C_o-C)/C_o\times100$ where $C_o$ is the initial concentration of $CN^-_{(aq)}$ and C is the concentration of uncomplexed $CN^-_{(aq)}$ in solution.

Results and Discussion

Formation of zinc oxide from the combination of zinc nitrate hexahydrate and CHA in aqueous medium can be illustrated by equation (1):

$$Zn(NO_3)_{2(aq\ or\ alc)}+2C_6H_{11}NH_{2(aq\ or\ alc)}+H_2O\rightarrow ZnO(nc)+2C_6H_{11}NH_3 \quad (Eq.\ 1)$$

CHA, according to equation 1, acts as a base in the Brønsted-Lowry sense, but not as a base in the Lewis sense (a ligand). This behavior of CHA was proven by the isolation and determination of the structure of cyclohexylammonium nitrate crystals by single-crystal X-ray diffraction. This observed Brønsted-Lowry basicity of CHA can be attributed to its moderate base strength ($pK_b$=3.36) when hydrolyzing in water according to equation 2:

$$C_6H_{11}NH_{2(aq)}+H_2O_{(l)}\leftrightarrows C_6H_{11}NH_3^+{}_{(aq)}+OH^-{}_{(aq)} \quad (Eq.\ 2)$$

Due to the high basicity of the CHA solution (pH=12.5), zinc ions react with the hydroxide ions and form different hydroxyl complexes such as $[ZnOH]^+$, $[Zn(OH)_2]_{(aq)}$, $[Zn(OH)_3]^+{}_{(aq)}$, and $[Zn(OH)_4]^{2-}{}_{(aq)}$. Furthermore, the high basicity makes the chemical potential of hydroxide ion [$OH^-$] high, leading to a shift in the equilibrium in equation 3 towards the formation of oxide ion ($O^{2-}$):

$$2OH^-{}_{(aq)}\leftrightarrows O^{2-}{}_{(aq)}+H_2O_{(l)} \quad (Eq.\ 3)$$

The formation of zinc hydroxide complexes and oxide ions shifts the equilibrium in equation 2 forward, causing further protonation of CHA and the formation of more hydroxide ions.

The formation of oxide ion according to equation 3 is responsible for the construction of Zn—O—Zn bonds by transforming the zinc hydroxide complexes into solid-phase according to equation 4:

$$2[Zn(OH)_n]^{2-n}{}_{(aq)}\leftrightarrows [Zn_2O(OH)_{2n-2}]^{4-2n}{}_{(aq)}+H_2O_{(l)} \quad (Eq.\ 4)$$

Equation 4 shows that the construction of ZnO crystal takes place via the interaction between the surface hydroxide of the growing crystals and the hydroxide ligands of the zinc complexes. Therefore, the formation of ZnO, according to the above proposed mechanism, is due to the high basicity of the reaction medium, which causes an increase in the concentration of the precursors (zinc hydroxide complexes) and an increase in the chemical potential of hydroxide ions.

Figure 1:
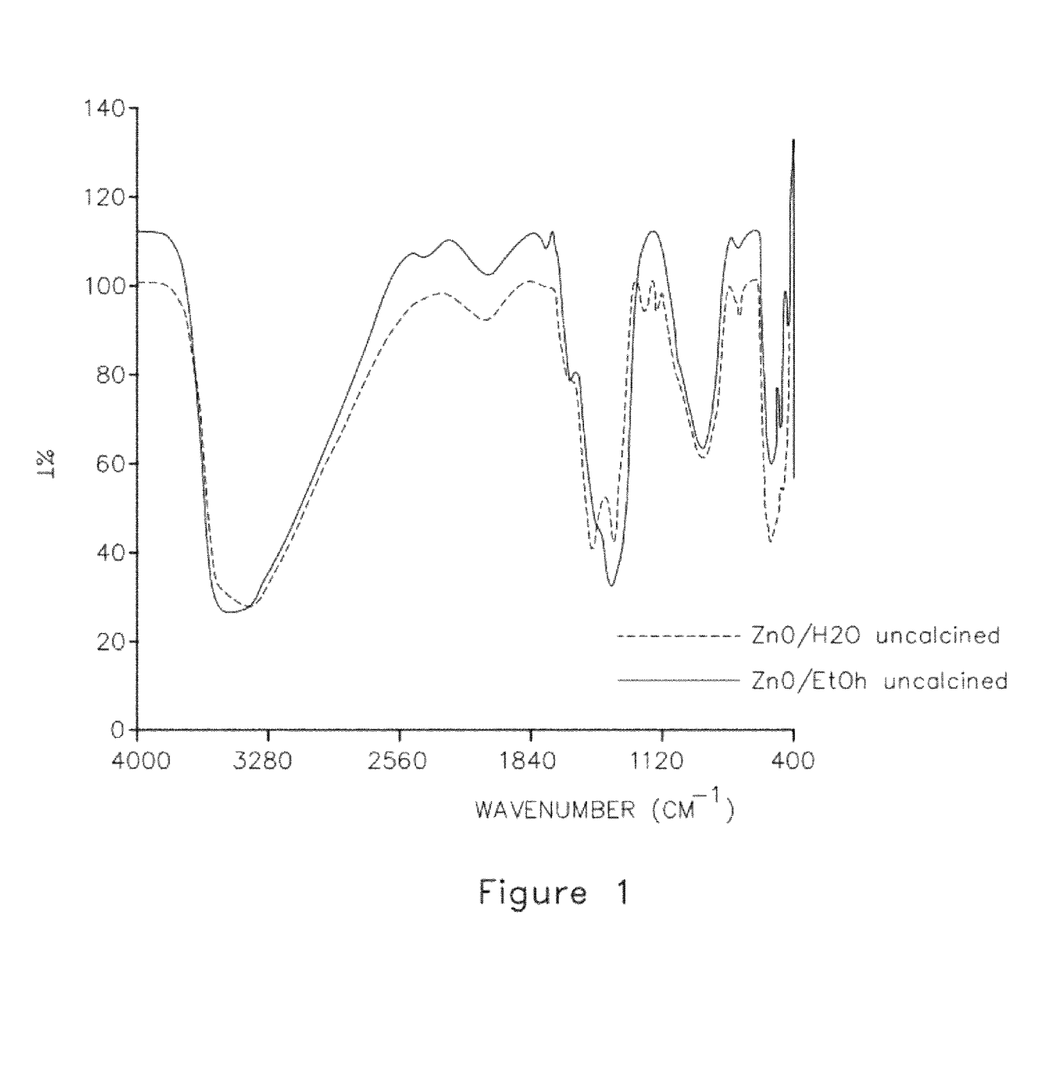
FIG. 1 shows diffuse reflectance infrared fourier transform (DRIFT) spectra of ZnO nanoparticles, prepared in either $H_2O$, before calcination.
Figure 2:
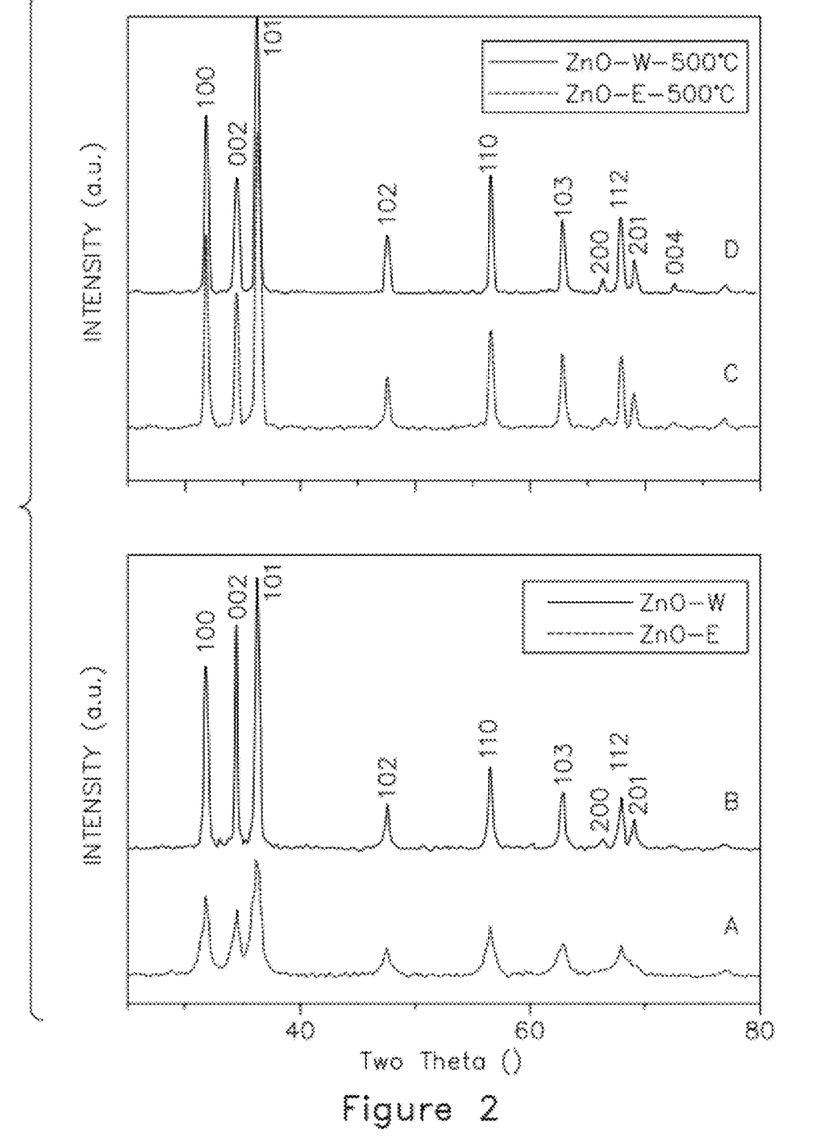
FIG. 2 shows X-ray diffraction (XRD) patterns of uncalcined ZnO nanoparticles, prepared in EtOH (A) and $H_2O$ (B). XRD patterns of calcined ZnO nanoparticles at 500° C., prepared in $H_2O$(C) and EtOH (D).

FIG. 1 shows the DRIFT spectra of the uncalcined ZnO nanoparticles, prepared in $H_2O$ media. The absorption bands in the region of 600-400 $cm^{-1}$ can be attributed to the crystal or lattice water. In addition, the asymmetric and symmetric stretching H—O—H vibration bands are observed between 3600 and 3200 $cm^{-1}$ while the bending H—O—H vibration bands are observed between 1630 and 1600 cm$^{-1}$. The water diagnosis by DRIFT is in agreement with the ICP prediction of water presence in the uncalcined $ZnO_W$ and $ZnO_E$ as shown above (see para 0029 and 0030).

FIGS. 2A, 2B, 2C, and 2D show the XRD diffraction patterns of all investigated solids. The patterns consist of broad peaks, which match the common ZnO hexagonal phase, i.e wurtzite structure. Before calcination, the sharper, higher peak intensities of $ZnO_W$ than those of $ZnO_E$ implies that the latter has a smaller crystallite size than that of the former. The average crystallite size, estimated by Scherrer's equation for the (100), (002) and (101) diffractions peaks, for $ZnO_E$ is almost half that of $ZnO_W$ (Table 1). After calcination, however, both of $ZnO_E$ and $ZnO_W$ had the same average crystallite size of 28.83 nm (Table 1). Such observation could be contributed to the difference in the number of moles of water of crystallization in each material, resulting in more shrinkage relative to particle coarsening the effect upon calcination for the $ZnO_W$.

TABLE 1

Average crystallite size of $ZnO_E$ and $ZnO_W$ before and after calcinations.

| | | | Miller Indices (hkl) | | | Average crystallite size (nm) |
|---|---|---|---|---|---|---|
| | | | 100 | 002 | 101 | |
| Crystallite size (nm) | Before Calcination | $ZnO_E$ | 13.95 | 14.47 | 18.24 | 15.55 |
| | | $ZnO_W$ | 33.49 | 28.96 | 39.25 | 33.90 |
| | After Calcination | $ZnO_E$ | 33.45 | 24.83 | 28.22 | 28.83 |
| | | $ZnO_W$ | 33.45 | 24.83 | 28.22 | 28.83 |

Figure 3:
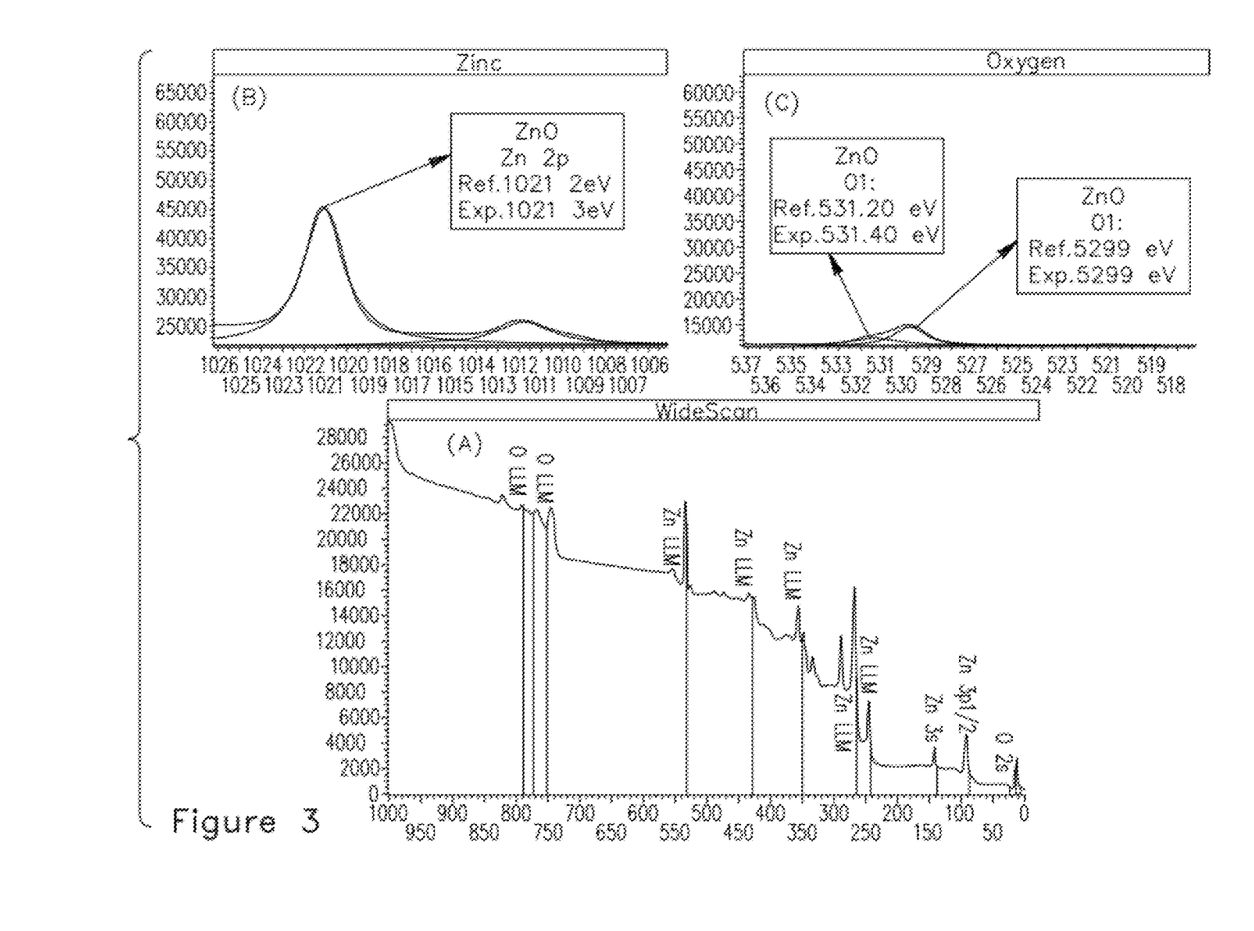
FIG. 3 shows the survey spectra of X-ray photoelectron spectroscopy (XPS) for $ZnO.\frac{1}{3}H_2O$, obtained in EtOH medium (A), $Zn\ 2_{3/2}$ XP spectra of $ZnO.\frac{1}{3}H_2O$ (B) and O 1 s XP spectra of $ZnO.\frac{1}{3}H_2O$(C).
Figure 4:
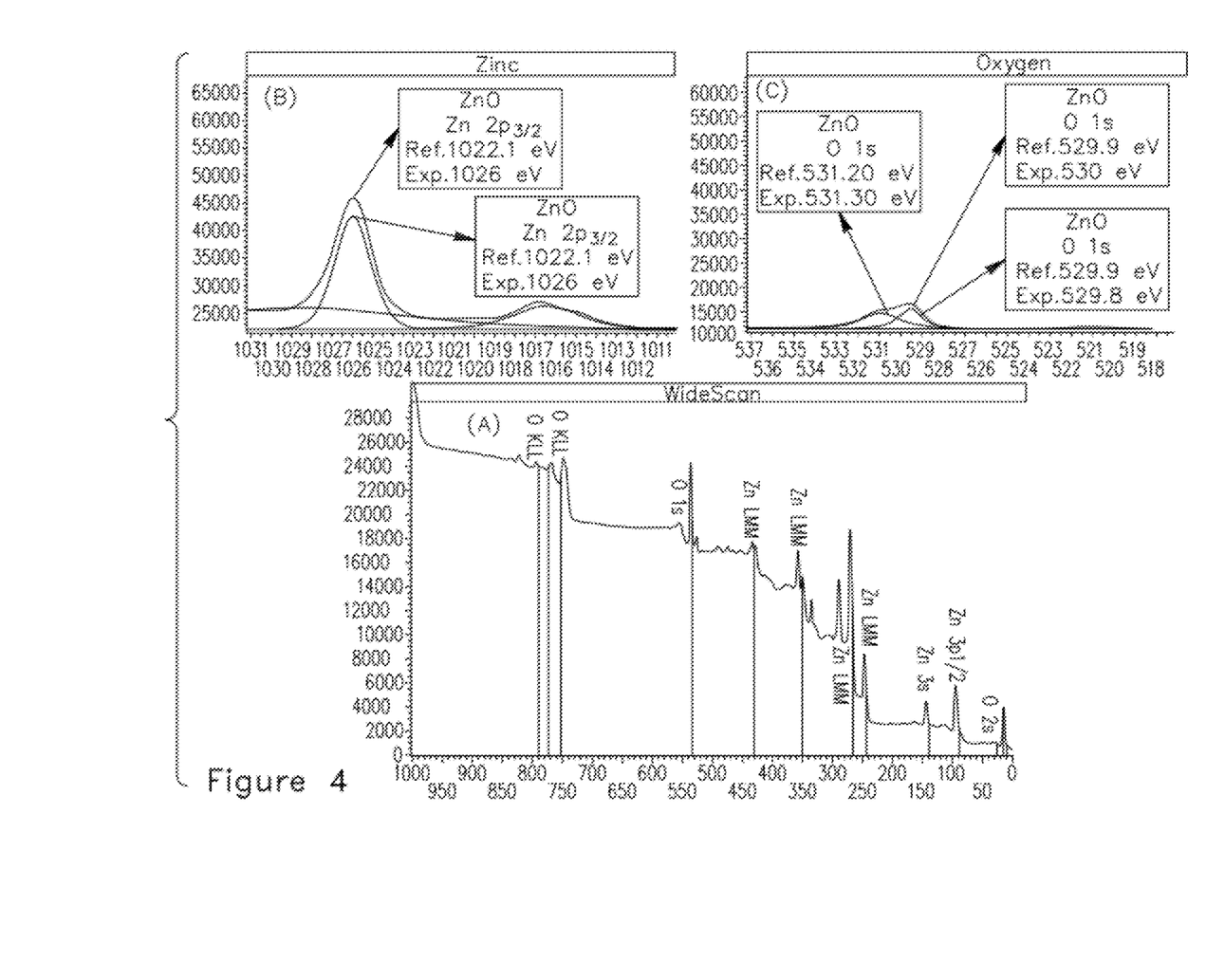
FIG. 4 shows the survey spectra of XPS for $ZnO.\frac{1}{2}H_2O$ (A), obtained in $H_2O$ medium, $Zn\ 2p_{3/2}$ XP spectra of $ZnO.\frac{1}{2}H_2O$ (B) and O 1 s XP spectra of $ZnO.\frac{1}{2}H_2O$(C).

FIG. 3 shows a typical wide scan spectrum for the uncalcined $ZnO_E$. The photoelectron peaks of Zn and O arise from the nanoparticles while C 1 s peak detection is attributed to the carbon paste, used to stick the sample on the mount. The chemical state of Zn in $ZnO_E$ nanoparticles is analyzed in detail by investigating Zn $2p_{3/2}$, Auger Zn LMM and O 1 s peaks. A noticeable shift was observed in the Auger signal spectra because of their high sensitivity to the chemical environment. The shown Zn $2p_{3/2}$ photoelectron line at BE of 1021.3 eV is characterizing the ZnO state. The asymmetric O 1 s peak was coherently fitted by two nearly Gaussian components, centered at 531.4 eV and 529.9 eV, characterizing the ZnO states. The same features were observed for the $ZnO_W$ nanoparticles, as shown in FIG. 4. The Zn $2p_{3/2}$ line at BE of 1026 eV, indicates the existence of ZnO state. The O 1 s line shows two nearly Gaussian components, centered at 529.8 and 531.3 eV, indicating the presence of ZnO state.

Figure 5:
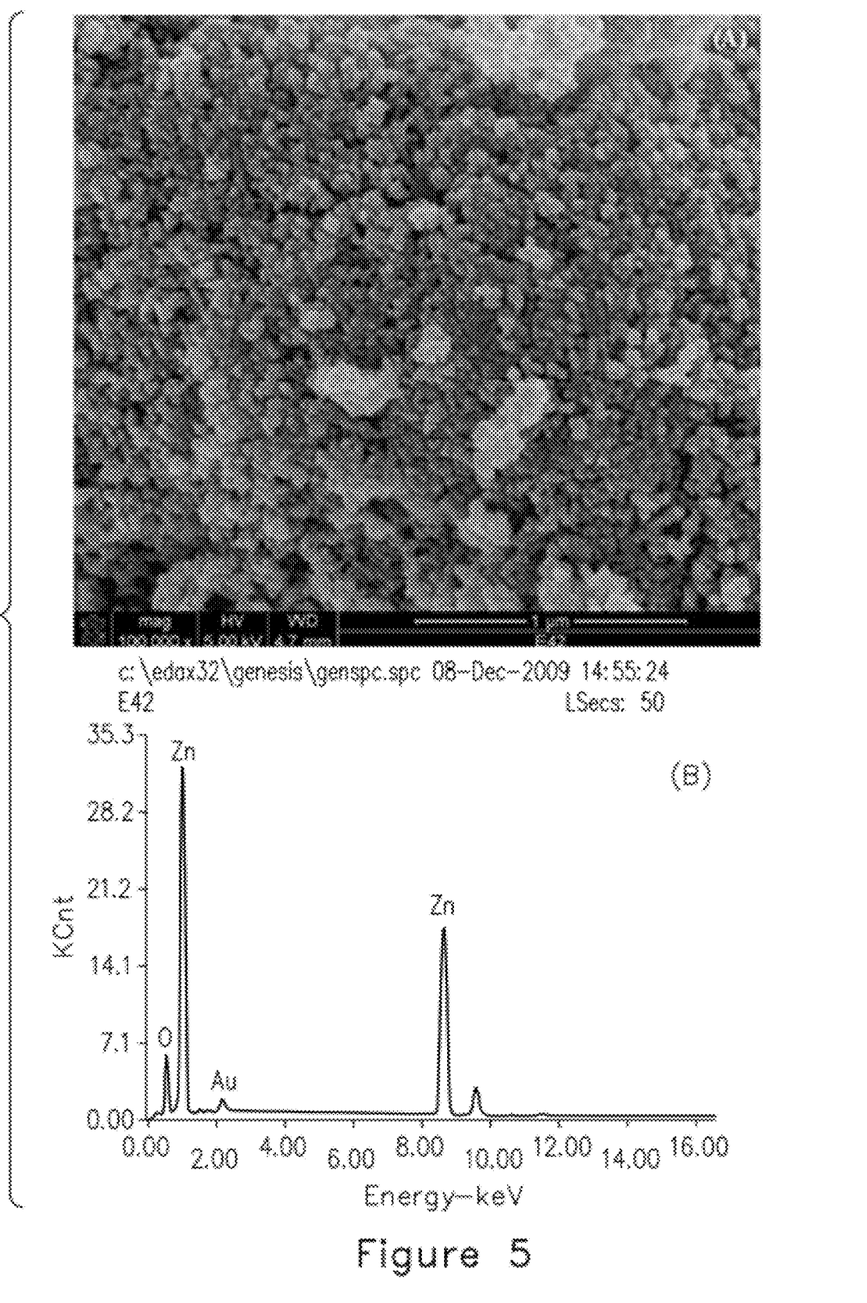
FIG. 5 (A) shows scanning electron micscpoicy SEM and (B) shows EDAX analysis for $ZnO_E$ before calcination.
Figure 6:
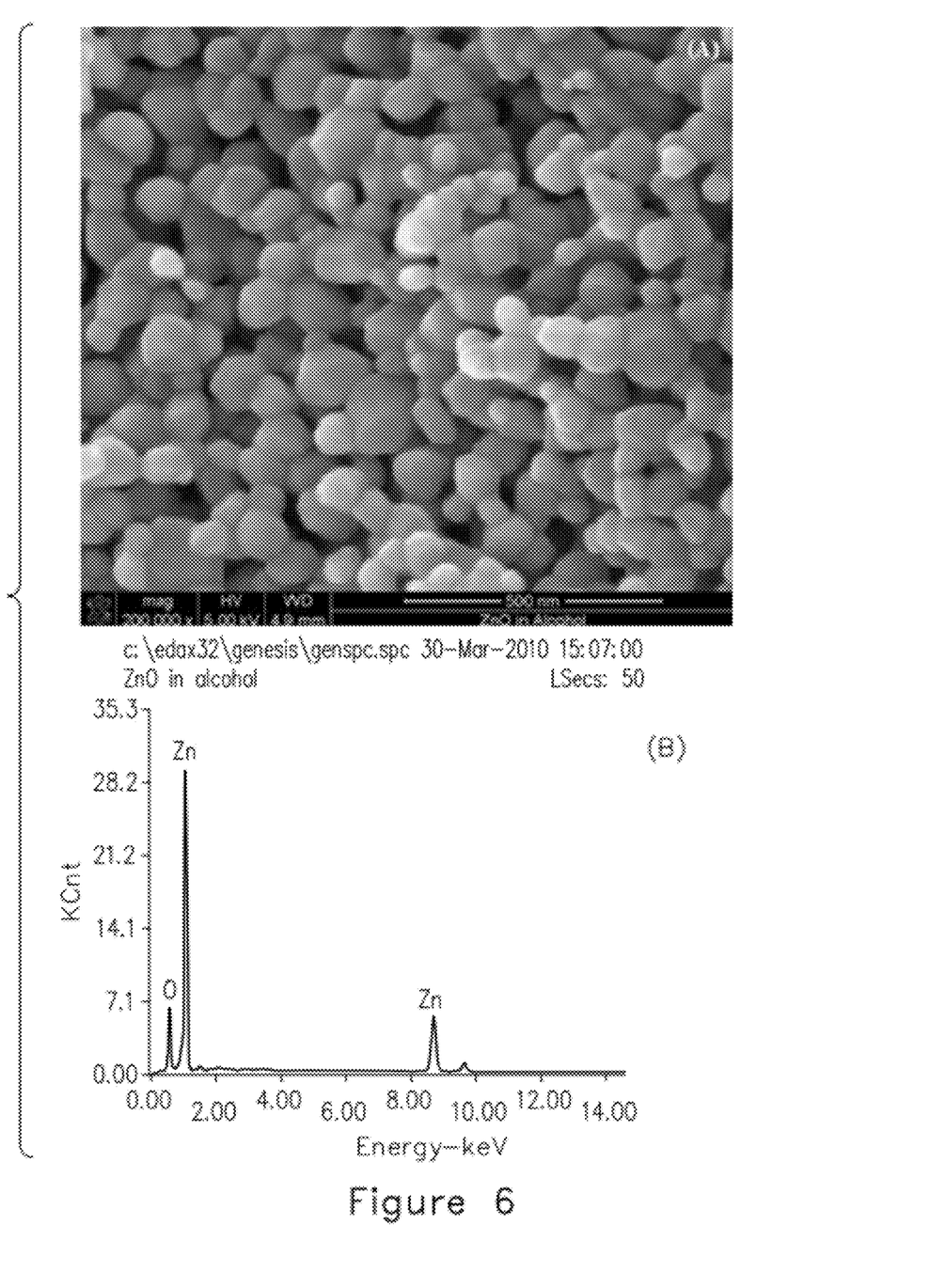
FIG. 6 shows scanning electron microscope (SEM) (A) and Energy-dispersive X-ray spectroscopy (EDX) analysis of $ZnO_E$ after calcination (B).
Figure 7:
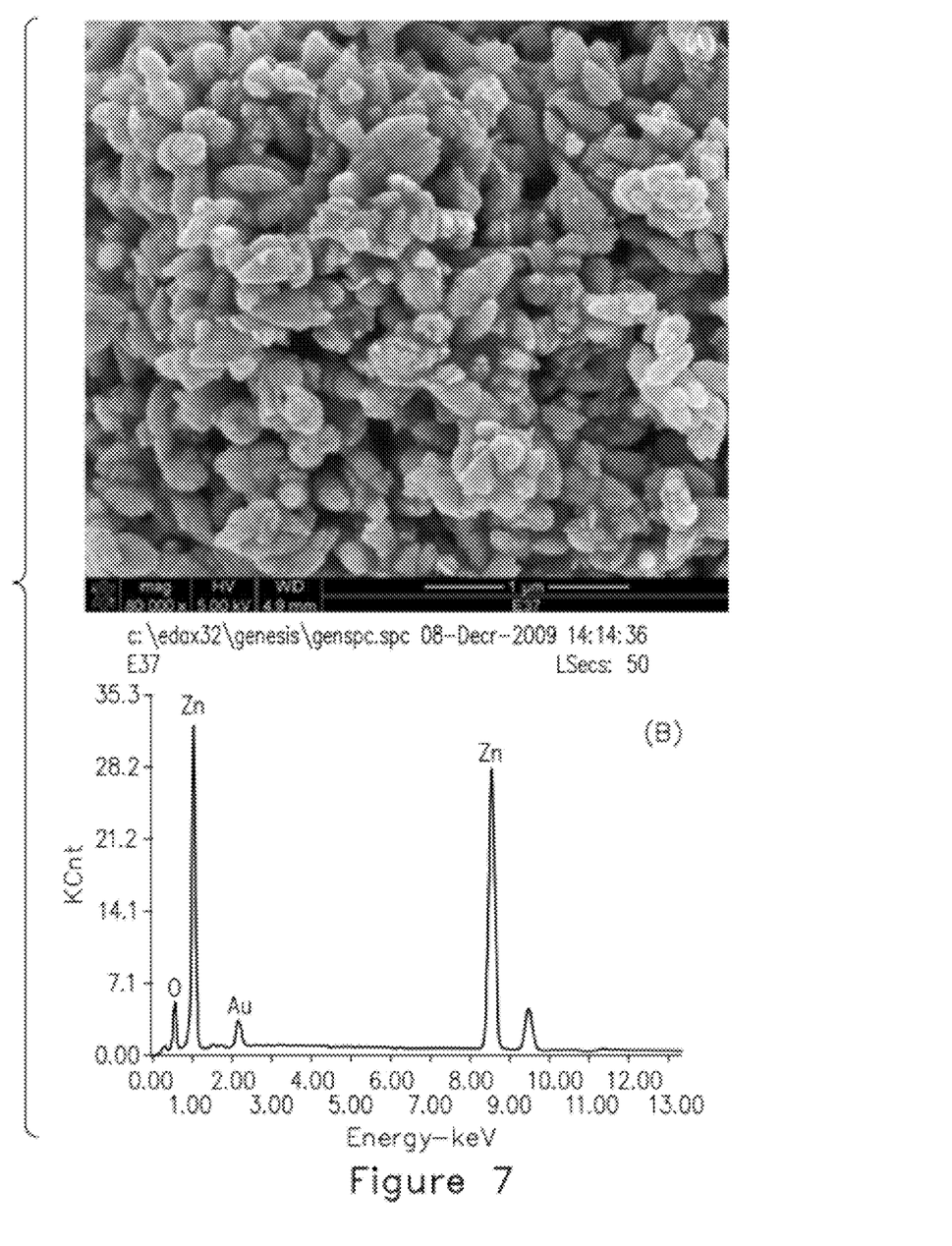
FIG. 7 shows SEM (A) and EDX (B) analysis of $ZnO_W$ before calcination.
Figure 8:
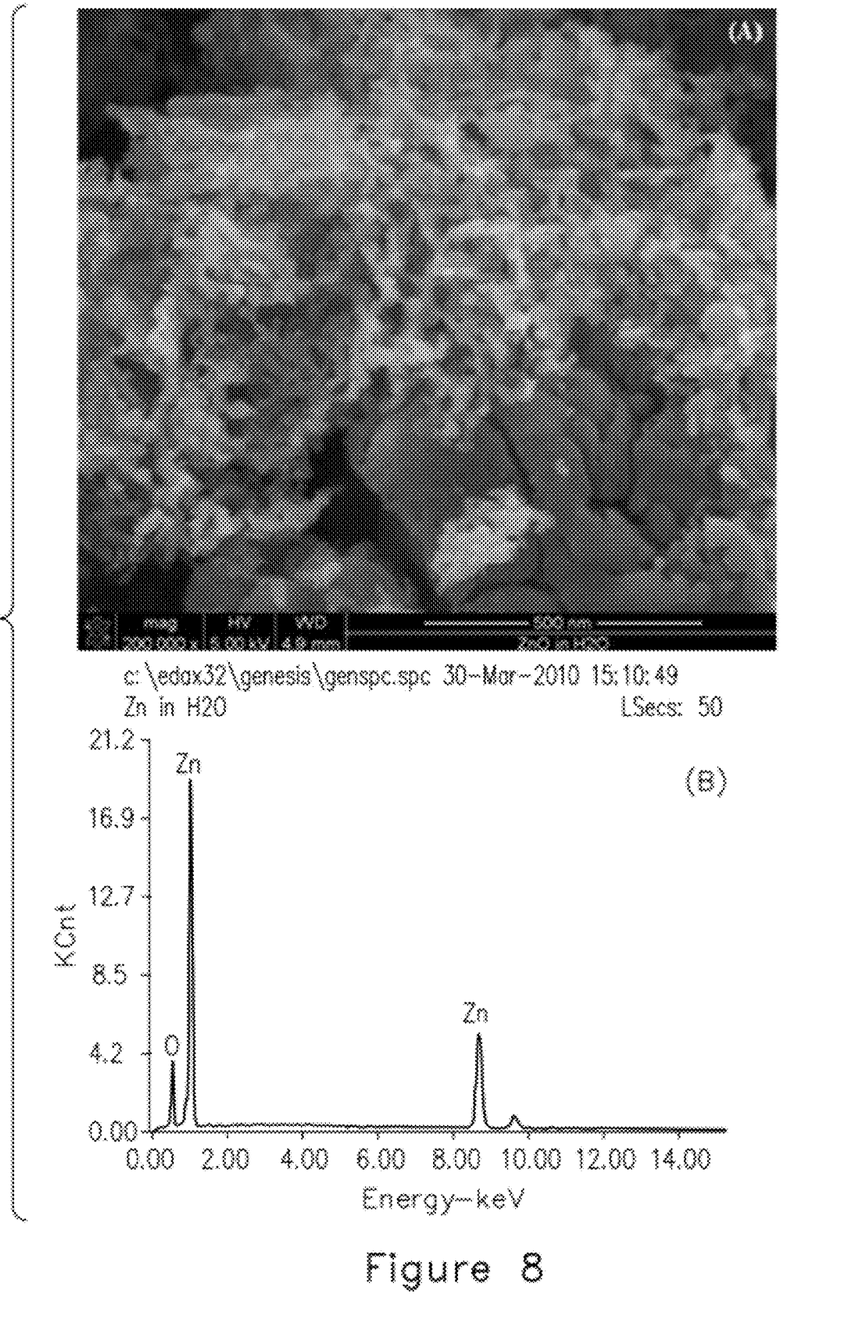
FIG. 8 shows SEM (A) and EDX (B) analyses of $ZnO_W$ after calcination.

FIGS. 5A and 6A show the SEM images of $ZnO_E$ before and after calcination, respectively, while FIGS. 7A and 8A show the SEM images of $ZnO_W$ before and after calcination, respectively. $ZnO_E$, before calcination, is composed of homogeneously defined nanoparticles. On the other hand, $ZnO_W$, before calcination, is made of irregularly-shaped, overlapped nanoparticles. Removal of lattice water upon the calcination process enhanced the nanoparticles features. Regular, polyhedral nanoparticles of an average size of 21 nm were observed for $ZnO_E$ after calcination. In homogenous, spherical particles with an average particle size of 32 nm along with some chunky particles were observed for $ZnO_W$. The EDX analyses before and after calcination (FIGS. 5B, 6B, 7B, and 8B) indicate the purity of all the synthesized samples with no peaks other than Zn and O. The Au peak is due to the conductive coating layer of gold. The EDX results are in parallel with the XP spectra, where both analyses proved the purity of the prepared zinc oxide.

Figure 9:
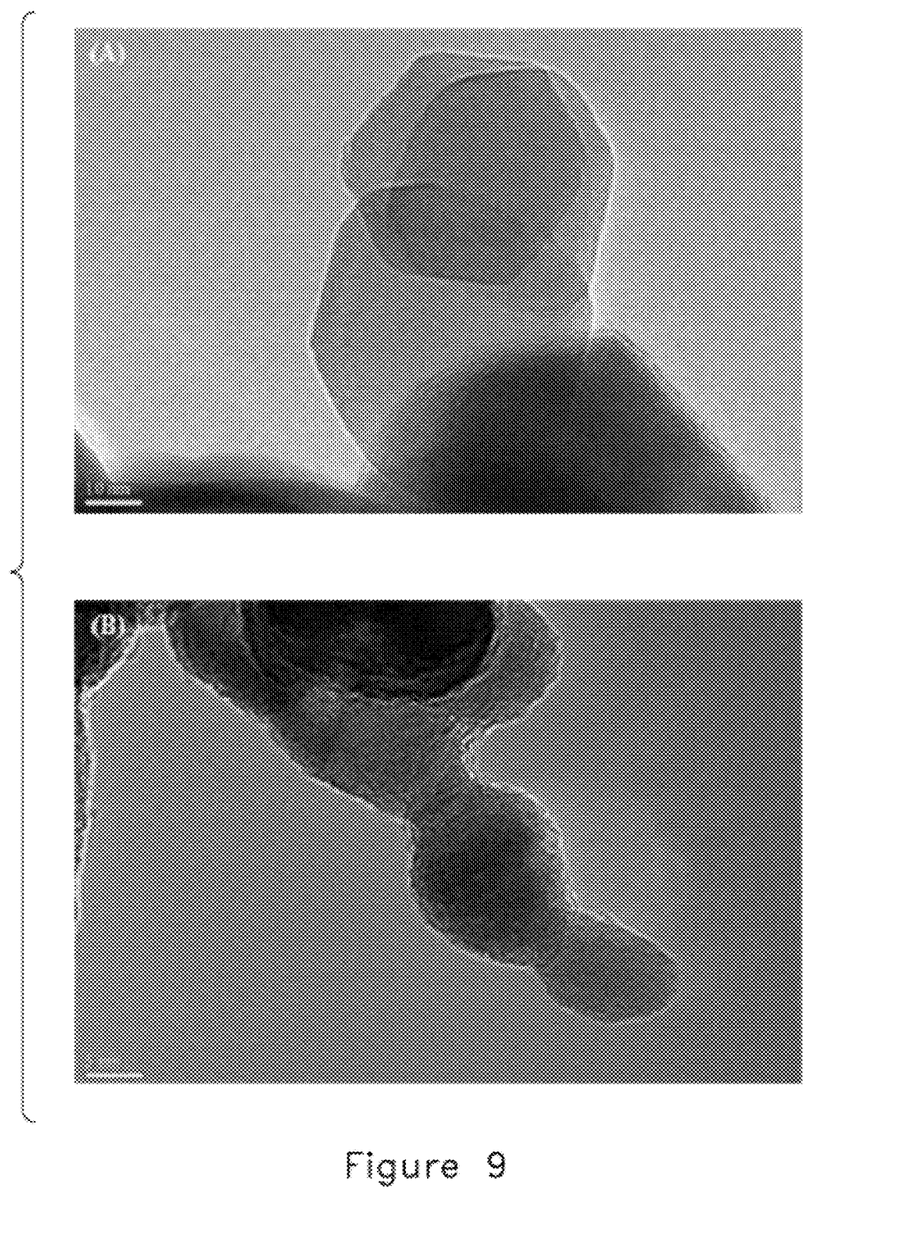
FIG. 9 shows TEM images of calcined $ZnO_E$ nanoparticles (×200 k) (A) and $ZnO_W$ (×300 k)(B).

TEM images (FIG. 9) of the samples after calcination supported the SEM micrographs regarding the morphology of ZnO nanoparticles. $ZnO_E$ nanoparticles adopt hexagonal shape (FIG. 9A), which is consistent with the regular, polyhedral morphology observed by SEM (FIG. 6A). However, $ZnO_W$ nanoparticles adopt an irregular spherical shape (FIG. 9B), which is consistent with the observed morphology by SEM (FIG. 8A). The more uniform polyhedral particles of $ZnO_E$ could be attributed to the lower polarity of EtOH, compared to that of water, leading to slower ionization and deposition rate and inhomogeneous nucleation that favor the polyhedral-shaped particles.

Figure 10:
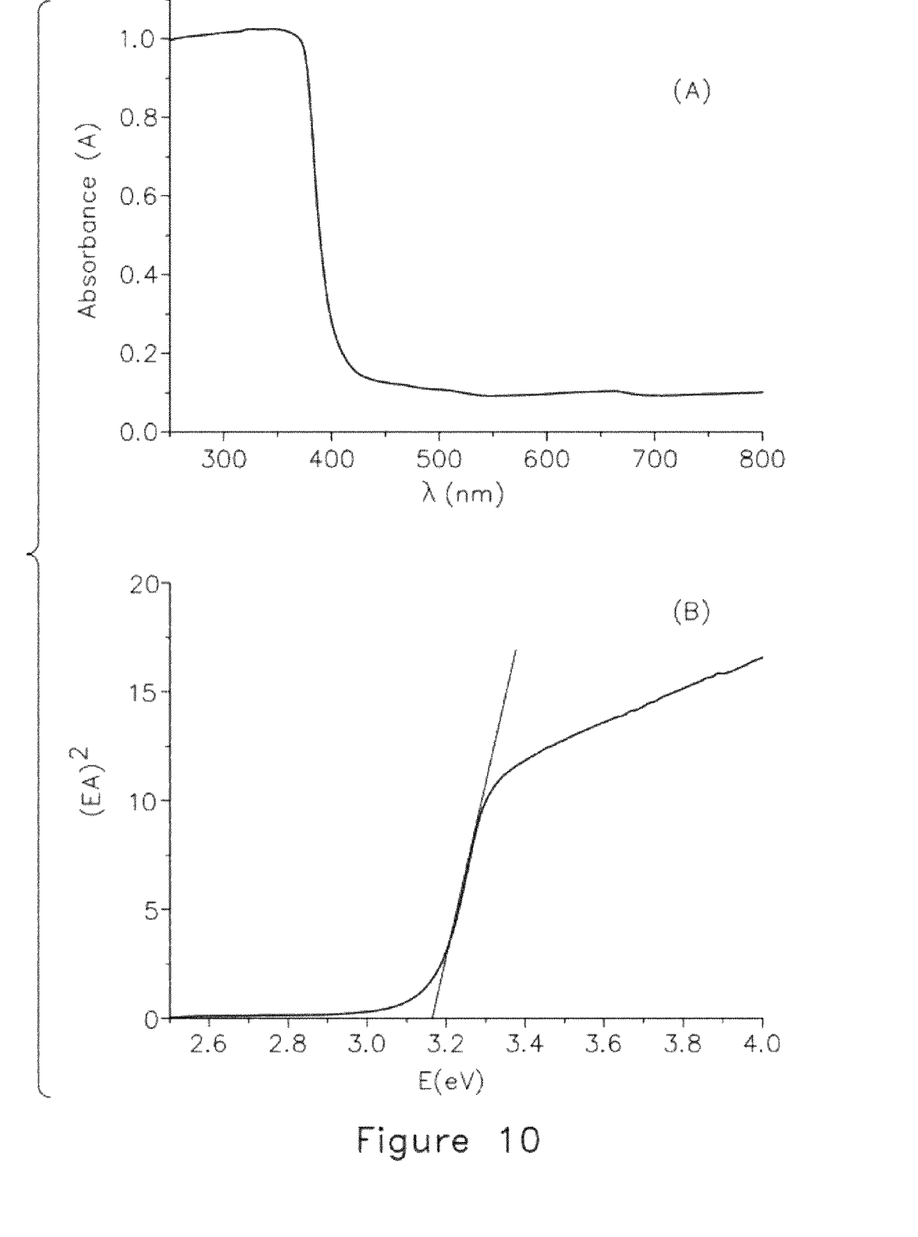
FIG. 10 shows UV-Vis absorption spectrum (A) and direct band-gap (B) for $ZnO_E$.
Figure 11:
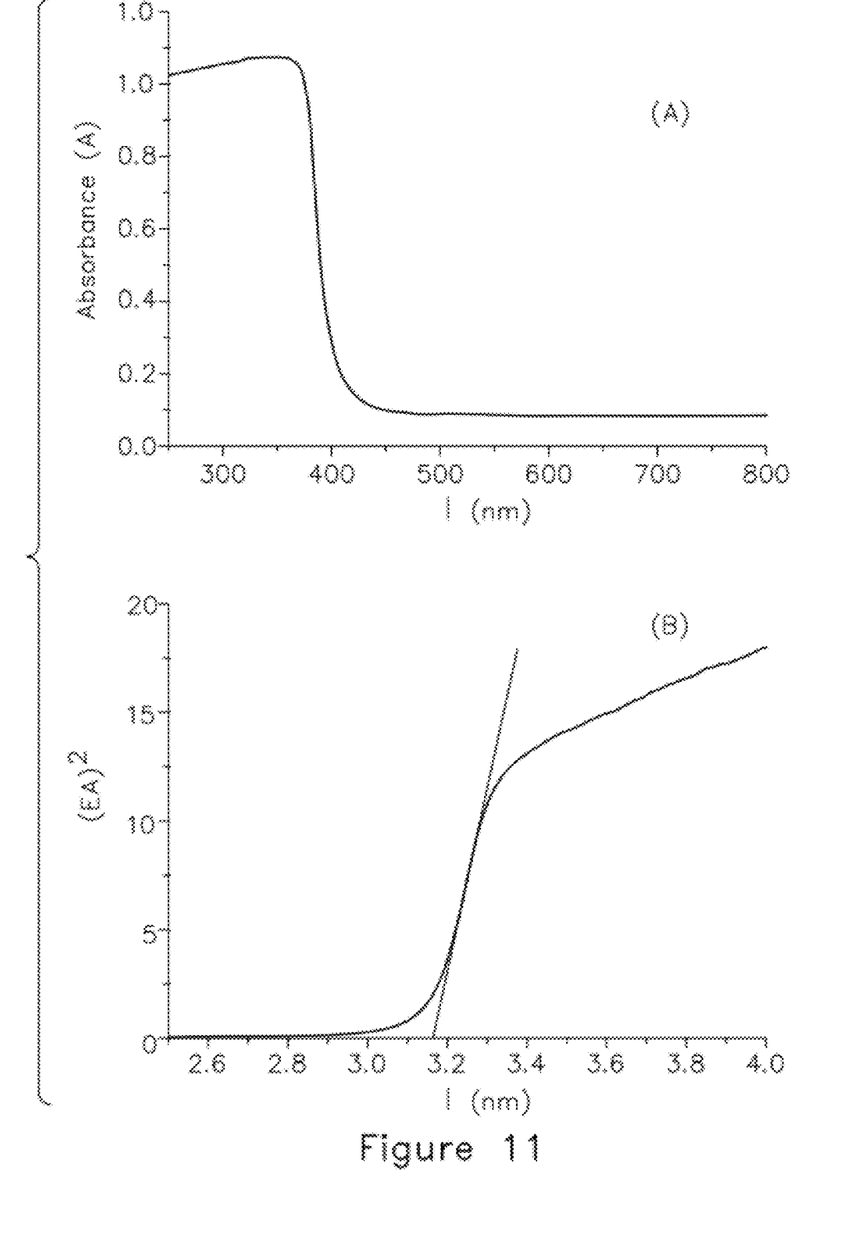
FIG. 11 shows UV-Vis absorption spectrum (A) and direct band-gap (B) for $ZnO_W$.
Figure 12:
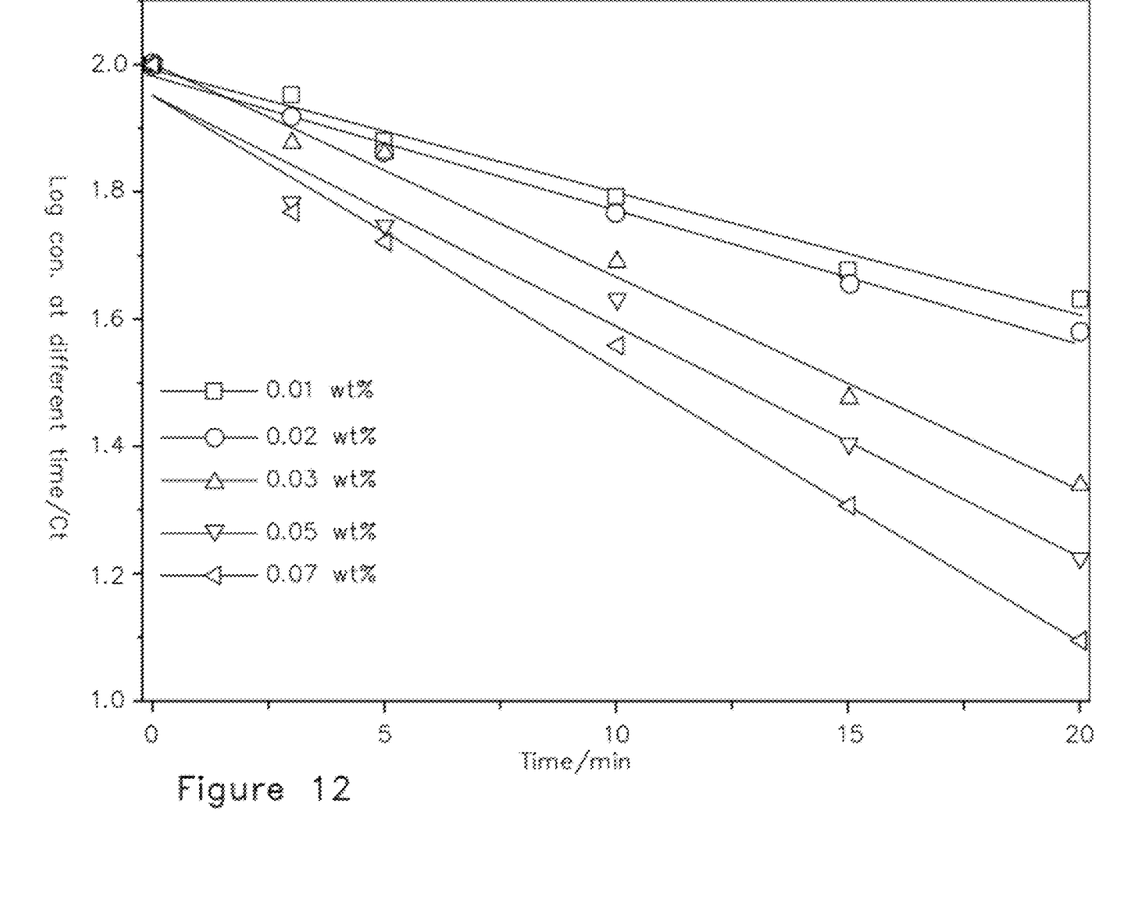
FIG. 12 shows Photodegradation kinetic of cyanide ion over calcined $ZnO_E$.

FIGS. 10A and 11A exhibit the UV-Vis absorption spectra for $ZnO_E$ and $ZnO_W$, respectively. The direct band-gap ($E_g$) estimations from these spectra for $ZnO_E$ and $ZnO_W$ are depicted in FIGS. 10B and 11B, respectively, where the x-axis is the photon energy (E) in eV and y-axis is the square of the product of absorbance (A) and energy $(AE)^2$. The absorption spectra and the $E_g$ (3.16 eV) for both materials are identical. Such observation implies that the optical properties of these materials are independent of their morphology (shape and size), and hence, are not affected by the synthesis medium.

Photocatalytic Degradation of Cyanide

Effect of the synthesis medium on photo-catalytic oxidation: The mechanism for the photocatalytic oxidation of cyanide by zinc oxide can be illustrated as follows:

$ZnO + 2h\nu = ZnO(2h^+ + 2e^-)$ $\frac{1}{2}O_2 + 2e^- + H_2O = 2OH^-$ $2OH^- + 2h^+ = 2OH.$ $CN^- + 2OH. = OCN^- + H_2O$ $2OCN^- + O_2 = 2CO_2 + N_2$ The overall reaction:

$ZnO/H_2O 2CN^- + 2O_2 \rightarrow 2CO_2 + N_2$

UV-Light where h is Planck's constant and ν is the frequency of UV light.

The effect of the synthesis medium on the photocatalytic efficiency of ZnO nanoparticles was explicitly noticed by the much higher efficiency of $ZnO_E$ than that of $ZnO_W$ in the photocatalytic degradation of cyanide ion in the aqueous medium under the same conditions.

Table 2 shows that the photocatalytic activity of $ZnO_E$ is ~1.5 that of $ZnO_W$ when applying 0.0166 wt % of the ZnO photocatalyst. The higher performance of $ZnO_E$ can be attributed to the higher adsorption capability of its particles, owing to its regular, polyhedral surface faces.

TABLE 2

Effect of the synthesis medium on photocatalytic activity.

| Sample | % of cyanide degradation |
|---|---|
| $ZnO_E$ | 86 |
| $ZnO_W$ | 56 |

Zinc oxide nanoparticles were readily prepared at RT from zinc nitrate hexahydrate and cyclohexylamine either in aqueous or EtOH medium. The calcined $ZnO_E$ had a regular, polyhedra morphology while the calcined $ZnO_W$ had an irregular spherical morphology, mixed with some chunky particles. The morphology was a key factor in the superior photocatalytic behavior of $ZnO_E$ over that of $ZnO_W$. The differences in morphology and photocatalytic behavior are strongly influenced by the physicochemical properties of the synthesis medium. $ZnO_E$ and $ZnO_W$ both may be used for removing cyanide from aqueous solutions.

This shows an efficient removal of cyanide from aqueous solutions. Water and soil may be treated with nanoparticles of $ZnO_W$ to remove cyanide as contaminant by photocatalytic degradation. In addition, the specification and drawings are to be regarded in an illustrative rather than as in a restrictive sense.

What is claimed is:

1. A method, comprising;
   dissolving zinc nitrate hexahydrate in ethanol at room temperature to make a solution one while stifling;
   dissolving cyclohexylamine in ethanol at room temperature to make a solution two;
   mixing and stifling the solution one and solution two with a magnetic stirrer for four days at room temperature to form a suspension of a zinc oxide nanoparticle;
   filtering the suspension of zinc oxide nanoparticle and collecting a precipitate of zinc oxide nanoparticle with a fritted filter;
   drying the precipitate of zinc oxide nanoparticle under vacuum for one day; and
   mixing water with the vacuum dried precipitate of zinc oxide nanoparticle to form a suspension of a zinc oxide photocatalyst with water ($ZnO_W$).

2. The method of claim 1, further comprising;
   mixing solution containing cyanide and the zinc oxide photocatalyst ($ZnO_W$) having a specific concentration; and
   degrading and removing the cyanide by using photocatalytic degradation for a specific time.

3. The method of claim 2, wherein the photocatalytic degradation is performed with UV light.

4. The method of claim 2, wherein the specific time is between 3 to 360 minutes.

5. The method of claim 2, wherein the specific concentration is 0.0166 wt % of zinc oxide photocatalyst ($ZnO_W$).

* * * * *